US012688671B2

(12) United States Patent
Martinicky

(10) Patent No.: US 12,688,671 B2
(45) Date of Patent: Jul. 21, 2026

(54) REAL-TIME STADIAMETRIC RANGING

(71) Applicant: Trijicon, Inc., Wixom, MI (US)

(72) Inventor: Brian R. Martinicky, Plymouth, MI (US)

(73) Assignee: Trijicon, Inc., Wixom, MI (US)

( * ) Notice: Subject to any disclaimer, the term of this patent is extended or adjusted under 35 U.S.C. 154(b) by 180 days.

(21) Appl. No.: 18/582,122

(22) Filed: Feb. 20, 2024

(65) Prior Publication Data

US 2024/0386695 A1 Nov. 21, 2024

Related U.S. Application Data

(60) Provisional application No. 63/466,844, filed on May 16, 2023.

(51) Int. Cl.

| | |
|---|---|
| ***G06T 7/50*** | (2017.01) |
| ***G06T 11/00*** | (2026.01) |
| ***G06V 10/75*** | (2022.01) |
| ***G06V 10/82*** | (2022.01) |
| ***G06V 10/88*** | (2022.01) |

(52) U.S. Cl.

CPC ................ *G06V 10/75* (2022.01); *G06T 7/50* (2017.01); *G06T 11/00* (2013.01); *G06V 10/82* (2022.01); *G06V 10/88* (2022.01); *G06T 2207/20084* (2013.01)

(58) Field of Classification Search

None

See application file for complete search history.

(56) References Cited

U.S. PATENT DOCUMENTS

| | | | | |
|---|---|---|---|---|
| 11,768,055 | B2 | 9/2023 | Mauricio | |
| 2011/0150348 | A1* | 6/2011 | Anderson | G05D 1/0088 382/224 |
| 2014/0177915 | A1 | 6/2014 | Fan et al. | |
| 2015/0108215 | A1 | 4/2015 | Ehrlich | |
| 2015/0241172 | A1* | 8/2015 | Roman | F41G 1/473 235/404 |
| 2016/0069640 | A1 | 3/2016 | Pretorius | |

(Continued)

FOREIGN PATENT DOCUMENTS

WO 2021226228 A1 11/2021

OTHER PUBLICATIONS

International Search Report for corresponding International Patent Application No. PCT/US2024/016709 dated Jun. 3, 2024 (2 pages).

(Continued)

*Primary Examiner* — Yanna Wu

(74) *Attorney, Agent, or Firm* — Harness, Dickey & Pierce, P.L.C.

(57) ABSTRACT

A method for displaying real time stadiametric range finding via an optic device includes receiving digital image data captured by one or more image capture devices, detecting at least one object in the digital image data, transforming the at least one detected object into graphical markup data and identification data, correlating the identification data with stored physical properties of one or more object types, calculating a distance to the at least one detected object using correlated object properties and image capture device properties, and displaying the calculated distance and graphical object markup cues on a display of the optic device.

20 Claims, 8 Drawing Sheets

(56) References Cited

U.S. PATENT DOCUMENTS

| | | | |
|---|---|---|---|
| 2019/0128643 | A1 | 5/2019 | York et al. |
| 2021/0136263 | A1* | 5/2021 | Pitman .................... G01C 3/14 |
| 2022/0128352 | A1 | 4/2022 | Binder |
| 2022/0326596 | A1 | 10/2022 | Legras et al. |
| 2024/0159502 | A1* | 5/2024 | Grinwald ................ F41G 3/323 |
| 2024/0265710 | A1* | 8/2024 | Chen ......................... G06T 7/00 |

OTHER PUBLICATIONS

Written Opinion for corresponding International Patent Application No. PCT/US2024/016709 dated Jun. 3, 2024 (6 pages).

* cited by examiner

REAL-TIME STADIAMETRIC RANGING

FIELD

The present disclosure relates to systems and methods for real-time stadiametric ranging, including real-time stadiametric ranging via an optic device.

BACKGROUND

Stadiametric ranging may be used in optic devices to estimate ranges from a user to a target object. Stadiametric ranging approaches for optic devices normally use fixed calibrated reticles for determining object range estimation values, and/or place manually-sized boxes around an object.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for displaying real time stadiametric range finding via an optic device includes receiving digital image data captured by one or more image capture devices, detecting at least one object in the digital image data, transforming the at least one detected object into graphical markup data and identification data, correlating the identification data with stored physical properties of one or more object types, calculating a distance to the at least one detected object using correlated object properties and image capture device properties, and displaying the calculated distance and graphical object markup cues on a display of the optic device.

An optic device includes a lens, an imager configured to capture digital image data via the lens, a display configured to display images to a user, memory configured to store physical properties of one or more object types, and computer-executable instructions, and at least one processor. The at least one processor is configured to execute the computer-executable instructions to receive the digital image data captured by the imager, detect at least one object in the digital image data, transform the at least one detected object into graphical markup data and identification data, correlate the identification data with the physical properties of one or more object types stored in the memory, calculate a distance to the at least one detected object using correlated object properties and image capture device properties, and display the calculated distance and graphical object markup cues on the display of the optic device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Real-Time Stadiametric Ranging System

Figure 1:
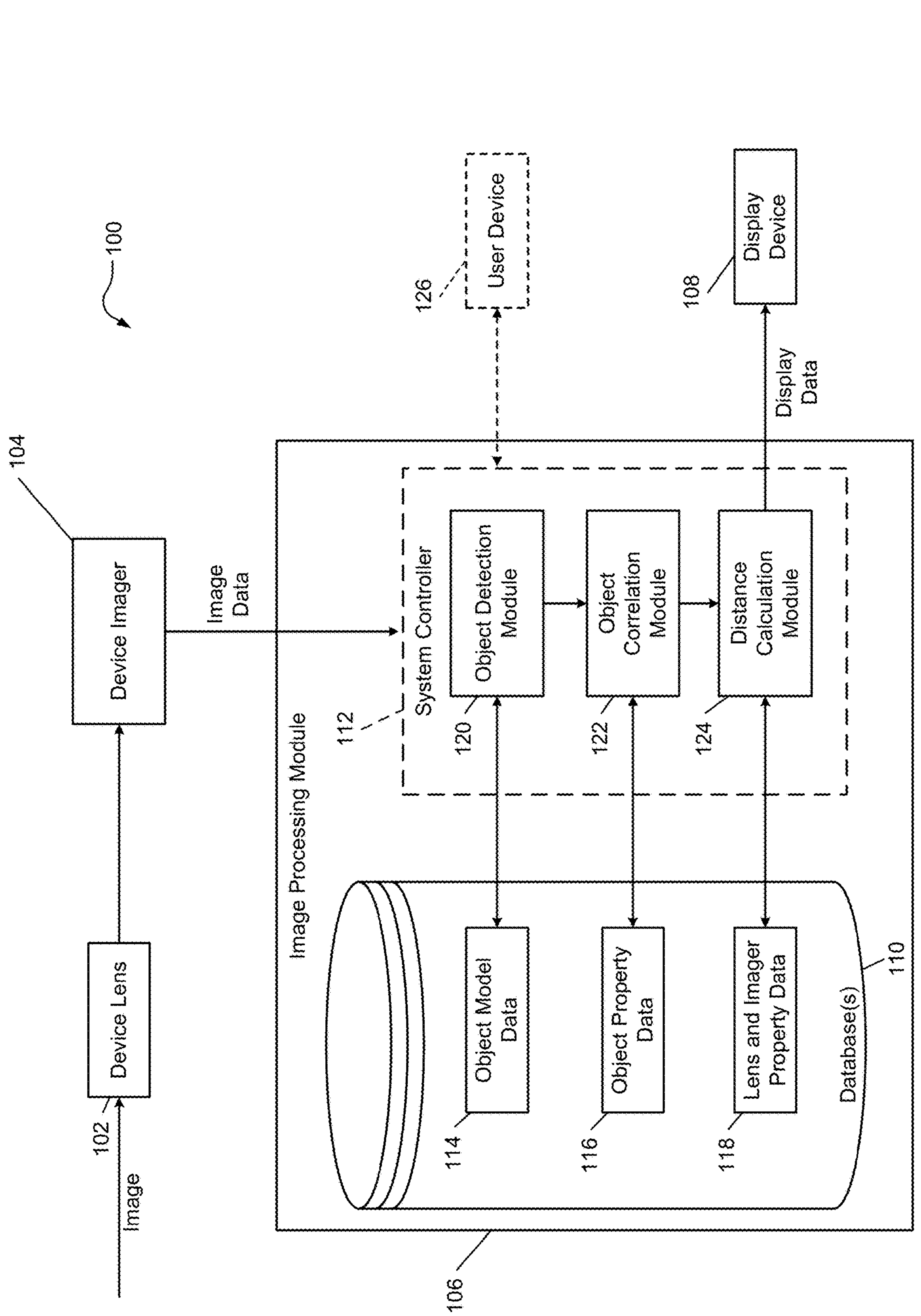
FIG. 1 is a functional block diagram of an example system for real-time stadiametric ranging using an optic device.

FIG. 1 is a functional block diagram of an example system 100 for automated real-time stadiametric ranging (e.g., using machine learning models), which includes a database 102. While the system 100 is generally described as being deployed in an optic device, the database 102 and/or components of the system 100 may otherwise be deployed (for example, as a standalone computer setup, a computer network, etc.). The system 100 may include a desktop computer, a laptop computer, a tablet, a smartphone, etc., such as for developing models for object detection.

As shown in FIG. 1, the system 100 includes a device lens 102, a device imager 104, an image processing module 106, and a display device 108. In various implementations, each of the device lens 102, the device imager 104, the image processing module 106, and the display device 108 may be separate components, or one or more of the device lens 102, the device imager 104, the image processing module 106, and the display device 108 may be integrated with one another. For example, the display device 108 may be a screen of the device imager 104, the device imager 104 may include the device lens 102, etc. In some example embodiments, a processing element may be located between imaging and the display. In other example embodiments, the display may be used as an aiming element, where object/distance data is sent out via a user device 126.

The lens 102 may refer to an objective lens, which projects a scene onto a focal plane inside an optic device. Depending on where in the electromagnetic spectrum the images are being captured from (e.g., visible light, near infrared (NIR), short wave infrared (SWIR), mid wave infrared (MWIR), or long wave infrared (LWIR)), lens construction and focal plane construction may differ. For visible and NIR, traditional glass lenses may be used, whereas with LWIR, special materials that pass infrared energy like germanium may be required.

Likewise, on the focal plane, for visible and NIR, CMOS imagers may be used, and photon capture devices may convert photons into image data. For LWIR, a microbolometer may be used, which may include small elements that are heated by elements in the scene, where the measured heat of each element is converted into image data (which may be referred to as thermal imaging). Example embodiments described herein may be applied to any suitable image capturing, such as image capturing along the electromagnetic spectrum, fused imagery (e.g., mathematically combining NIR and LWIR imagery to improve object detection), etc.

The database 402 stores object model data 114, object property data 116, and lens and imager property data 118. In various implementations, the database 102 may store other types of data as well. The object model data 114, the object property data 116, and the lens and imager property data 118 may be located in different physical memories within the database 102, such as different random access memory (RAM), read-only memory (ROM), a non-volatile hard disk or flash memory, etc. In some implementations, the object model data 114, the object property data 116, and the lens and imager property data 118 may be located in the same memory (such as in different address ranges of the same memory). In various implementations, the object model data 114, the object property data 116, and the lens and imager property data 118 may each be stored as structured data in any suitable type of data store.

The object model data 114 may include any suitable model data for detecting objects in digital image data, such as image data captured by the device imager 104. For example, the object model data 114 may include normalized correlation models, feature-based pattern matching models, convolutional neural network (CNN) models with machine learning, etc.

The object model data 114 may include any suitable data for training one or more machine learning models, such as historical data structures related to one or more of the object property data 116, the lens and imager property data 118, etc. For example, object model data 114 may include historical feature vector inputs that are used to train one or more machine learning models to generate a prediction output, such as a prediction of a type of a detected object in captured digital image data.

In various implementations, users may train a machine learning model by accessing the system controller system controller 112 of the image processing module 106 via a user device 126. The user device 126 may include any suitable user device for displaying text and receiving input from a user, including a desktop computer, a laptop computer, a tablet, a smartphone, etc. In various implementations, the user device 126 may access the database 102 or the system controller 112 directly, or may access the database 102 or the system controller 112 through one or more networks. Example networks may include a wireless network, a local area network (LAN), the Internet, a cellular network, a USB connection, a BLUETOOTH short-range wireless communication connection, etc.

The system controller 112 may include one or more modules for automated real-time stadiametric ranging. For example, FIG. 1 illustrates an object detection module 120, an object correlation module 122, and a distance calculation module 124.

The object detection module 120 may be configured to detect one or more objects in digital image data captured by the device imager 104 from the lens 102. For example, the object detection module 120 may execute one or more object detection algorithms stored in the object model data 114 of the database 102.

In some example embodiments, the object detection module 120 may be configured to detect objects that the module has been previously trained to detect. The object detection module 120 may transmit an indication to the object correlation module 122 that it has detected a deer, an enemy combatant, etc., along with a location of the object in the scene and geometric data about the detected object. For example, the geometric data may include a simple bounding box that encloses the object, a path that describes an outline of the object, etc. The object correlation module 122 may take the object type that the detector found, and aggregate additional information to the match related to how tall, wide, long, etc. the average object is that has the detected type. For example, the object information may include a min/max/average if it adds to the targeting experience, and data that allows labeling the object in the display such as 'Deer', 'Enemy', etc.

Matching and detection are generally probabilistic, so the object correlation module 122 may be configured to select a strongest match, possibly displaying a confidence level on the display device 108 alongside the detected object. During field refinement of an example ML model, multiple matches may be exposed if present, and a refiner may reorder the match list, reject matches, etc., in order to improve accuracy of the object detection model.

The object correlation module 122 may be configured to correlate detected object(s) with object types and properties. For example, the object correlation module 122 may match the detected object(s) with stored properties of different object types in the object property data 116 of the database 102. The object property data 116 may include, for example, a minimum height of each object type, a maximum height of each object type, an average height of each object type, a minimum area of each object type, a maximum area of each object type, an average area of each object type, etc.

The distance calculation module 124 is configured to estimate a range to the detected objects. The estimated range may be calculated based on lens and imager property data 118 stored in the database 102. For example, the lens and imager property data 118 may include a focal length of one or more image capture devices (such as the device imager 104 and/or lens 102), a field of view of one or more image capture devices, a focal plane geometry of one or more image capture devices, etc.

In some example embodiments, it may be desirable for the system controller 112 to know the focal length of the objective lens (such as the lens 102). Other example lens and imager property data 118 may include lens distortion information, geometric properties of the focal plane used by the image capture device (e.g., width, height, pixel geometry, and horizontal/vertical pixel pitch), etc.

Using this data, the system controller 112 may determine a Minute Of Angle (MOA) that a pixel represents, which is important for distance calculation and is fixed to the physical properties of the scope. Upon receiving a match from the object correlation module 122 which indicates how many pixels the object consumes (e.g., an object height, an object width, an object area, etc.), and the assumed height, width, and/or area, the system controller 112 may be configured to calculate a distance to the object. In an example for purposes of simple illustration, if the physical properties of an optic yield 1 MOA per pixel, the detected object is 10 pixels high, and the object database says the object is typically 10" tall, this may result in a 100 yard estimated range.

As shown in FIG. 1, the system controller 112 may display determined real-time stadiametric ranging information as digital display data on the display device 108. For example, the system controller 112 may be configured to update graphics of the display device 108 to display a highlight of the detected object(s), an estimated range of the detected object(s), a description of the detected object(s), etc. In various implementations, two or more estimated ranges may be displayed, where each estimated range corresponds to a different detected object. Other example display data may include other visual cues that mark the object found, identifying information such as object name, assumed object size, and estimated object range, etc.

Figure 2:
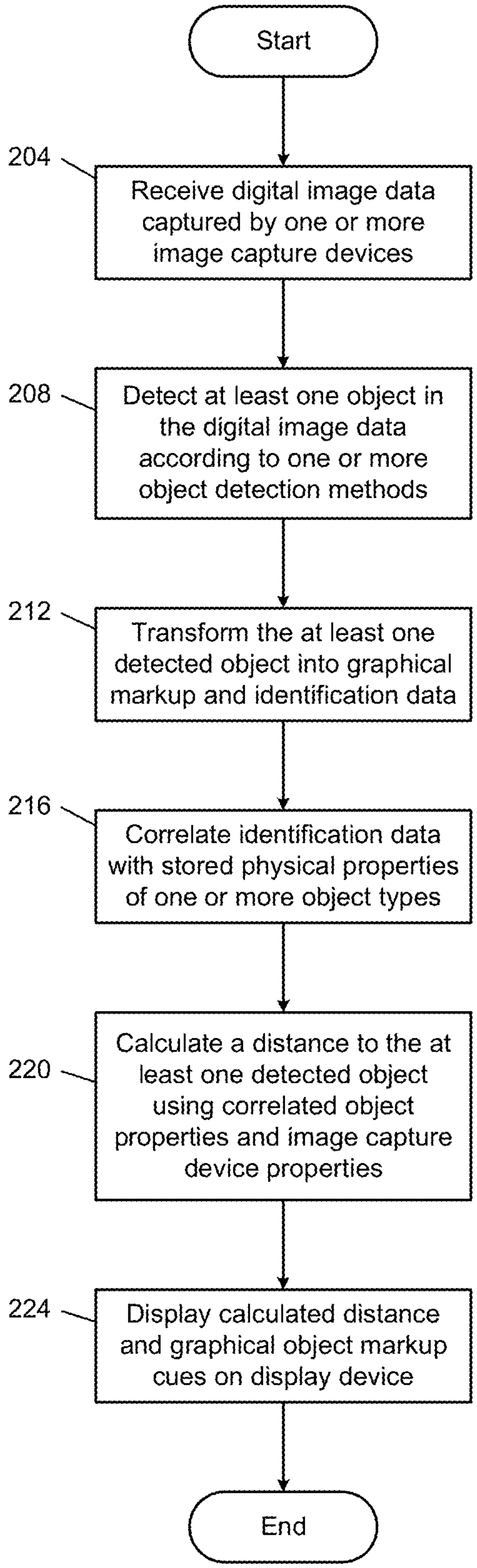
FIG. 2 is a flowchart depicting an example process for real-time stadiametric ranging using an optic device.

FIG. 2 is a flowchart depicting an example process for real-time stadiametric ranging using an optic device. The process of FIG. 2 may be implemented by any suitable controller, such as the system controller 112 of the image processing module 106 of FIG. 1.

At 204, the controller is configured to receive digital image data captured by one or more image capture devices. The one or more image capture devices may include at least one of a lens of the optic device (such as the lens 102 of FIG. 1) or an imager of the optic device (such as the device imager 104 of FIG. 1).

In various implementations, the digital image data captured by the one or more image capture devices includes image data captured via at least one of multiple image capture angles, multiple image capture wavelengths, multiple image capture bit depths, and multiple image capture resolutions.

In some situations, especially where a target object rotates in/out of poses that allow for high-confidence identification, capturing images at multiple angles, wavelengths, bit depths, resolutions, etc., may facilitate maintaining an aggregated confidence level of an estimated range or detection of the target object. As an example, in an initial pose of a target object may be facing away from the optic device, which may a medium confidence match to, e.g., a deer. If the deer moves into a full broadside pose, the system controller 112 may determine a high-confidence match. If the deer turns to facing away from the optic again, a high-confidence match may be maintained based on the prior detection, and the estimated range may be maintained which corresponded to the high confidence identification.

With regards to building a comprehensive database of object models (such as the object model data 114 of the database 102), there is an advantage to capturing object images at a multitude of angles, poses, lighting conditions, obscurants, etc. When the optic has an Inertial Measurement Unit (IMU), the optic can use its current attitude to improve matches (e.g., if an object is captured in the model looking down at a 30 degree angle, a weak match can be strengthened if the optic is pointed 30 degrees downward when the match occurred).

At 208, the controller is configured to detect at least one object in the digital image data. Detecting the object(s) may include applying an object detection algorithm to the digital image data, such as an object detection algorithm stored in the object model data 114 of the database 110 of FIG. 1. For example, any suitable object detection algorithm may be used, such as normalized correlation, feature-based pattern matching, or a convolutional neural network (CNN), etc.

Example machine vision pattern matching methods range from brute force normalized correlation, to employing strategies that extract features (e.g., vertices, inflection points, sharp gradient shifts, etc.) in a manner that facilitates high-confidence descriptions of types of objects which may be found, while being compact enough to allow for fast and efficient runtime matching.

Different model algorithm approaches may have different weaknesses in terms of scale, rotation, or contrast variance. Some model algorithms may be more compute efficient. Convolutional Neural Networks (CNNs) and Machine Learning (ML) approaches may be configured to describe objects in terms of a significantly larger number of features that are weighted in terms of how important they might be in the object identification process, which may lead to higher-confidence matches. The machine learning process may refine those weights to provide more accurate object detection over many scenes, poses, etc.

In some example embodiments, a machine vision approach may be used for speed and ease of implementation, which may lead to a system that is able to provide high confidence matches in a fewer number of object orientations (e.g. matching a fully broadside pose but not reliably matching facing away pose). In various implementations, object detection events may correlate to desired position(s) of a target object for an effective shot.

As another example, a CNN/ML approach may include building a training model on a fixed number of targets (e.g. stock photos), and using machine learning (ML) to refine the trained model over time, based on multiple situations in the field. For example, a system administrator may take the optic device on a hunt capable of executing the matching model, and mark false positives and false negatives, which have the effect of altering the vast number of weights the CNN relies on The controller is configured to transform the at least one detected object into graphical markup data and identification data, at 212. Transforming detected object(s) may include generating graphical outline data to highlight the at least one detected object on the display of the optic device. In various implementations, the identification data includes at least one of an identification of the at least one detected object, a placement location of the at least one detected object, or an orientation of the at least one detected object.

For a bounding box or object outline/silhouette, a continuous path may be established that encloses the object in question, which may include specified vertical and horizontal minima and maxima for the bounding box, or a path description for a highlighted outline around the object. The object detection module 120 of FIG. 1 may process a pixel representation of objects, and may be configured to describe a detected object in terms of bounding boxes and/or paths.

In some example embodiments, the object correlation module 122 may not be concerned with this visual representation, and may pass data through to the distance calculation module 124. The distance calculation module 124 may be configured to aggregate distance information onto geometric and decorative information used in generating a useful visual display. In various implementations, other layouts may be used based on practical considerations of efficiencies in storage, bandwidth, compute cycles, etc. In some example embodiments, a display module may be configured to actually render data from previous modules into a viewable representation.

At 216, the controller is configured to correlate the identification data with stored physical properties of one or more object types. For example, the database 102 may be configured to store physical properties of multiple object types, such as in the object property data 116.

Correlating the identification data may include matching the identification data with the stored physical properties of the multiple object types, to select a strongest match between the identification data associated with the at least one detected object and the stored physical properties of at least one of the multiple object types. In various implementations, the stored physical properties include at least one of a minimum height of each object type, a maximum height of each object type, an average height of each object type, a minimum area of each object type, a maximum area of each object type, or average area of each object type.

At 220, the controller is configured to calculate a distance to the detected object(s) using correlated object properties and image capture device properties, such as the object property data 116 and the lens and imager property data 118 of the database 102 of FIG. 1. Calculating the distance may include calculating an estimated range from the optic device to the at least one detected object based on at least one of a correlated height of the at least one detected object, a correlated area of the at least one detected object, or an orientation of the at least one detected object.

In various implementations, calculating the distance includes calculating the estimated range according to at least one physical property of the one or more image capture devices. For example, the at least one physical property may include a focal length of the one or more image capture devices, a field of view of the one or more image capture devices, a focal plane geometry of the one or more image capture devices, etc.

At 224, the controller is configured to display the calculated distance and graphical object markup cues on a display of the optic device, such as the display device 108 of FIG. 1. Displaying the calculated distance may include updating graphics of the display of the optic device to display at least one of a highlight of the at least one detected object, an estimated range of the at least one detected object, and a description of the at least one detected object. In various implementations, two or more estimated ranges may be displayed, where each estimated range corresponds to a different detected object.

Figure 3:
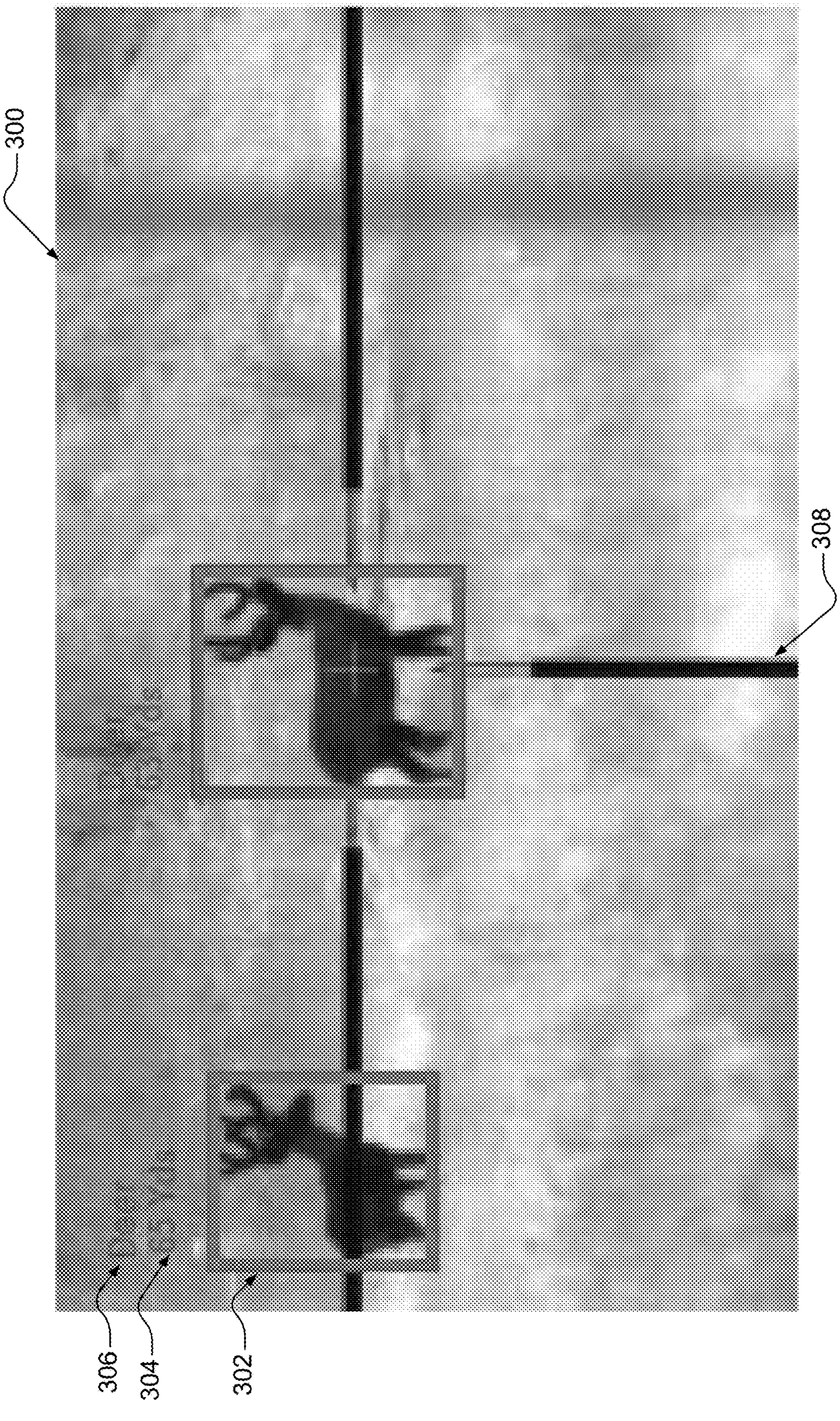
FIG. 3 is an image depicting an example display screen for displaying real-time stadiametric ranging data.

FIG. 3 is an image depicting an example display screen 300 for displaying real-time stadiametric ranging data. The display screen 300 may be displayed on a screen an optic device, such as the display device 108 of the system 100 of FIG. 1.

As shown in FIG. 3, two deer are visible on the display screen 300. In order to assist a user and provide real-time stadiametric ranging information, the display screen 300 is configured to display a bounding box 302 around each deer object.

The system calculates an estimated range to each deer object, and displays the estimated range 304 for each object on the display screen 300. For example, the display screen 300 is displaying an estimated range 304 of approximately 65 yards to the deer on the left of the display screen 300, and an estimated range 304 of 63 yards to the deer in the center of the display screen 300.

The system also includes an object description 306 with each object. As shown in FIG. 3, the detected object type of "Deer" is displayed as the object description associated with each object on the display screen 300. Although FIG. 3 illustrates the estimated range 304 and object description 306 displayed above a rectangular bounding box 302 for each deer object, in other example embodiments the estimated range 304 and object description 306 may be displayed at other suitable locations relative to the object and/or the corresponding bounding box 302, the bounding box 302 may have other shapes, the bounding box 302 and/or the object description 306 may not be displayed for each object (e.g., where only an estimated range 304 for each object is displayed), etc. In some example embodiments, information such as color, of a line/path thickness to the line/path, composition (e.g., solid, dashed, etc.) of the line/path, etc., may be used to distinguish between confidence levels and classes of target (e.g., combatant, animal, unknown, etc.).

Figure 7A:
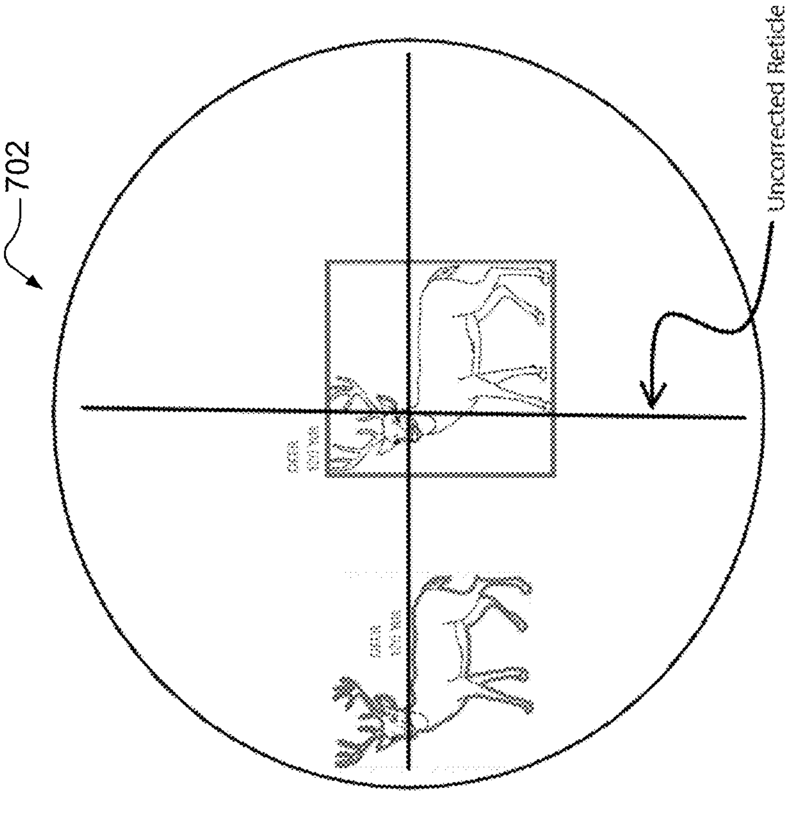
FIG. 7A is an image depicting an example display screen for displaying an uncorrected reticle.
Figure 7B:
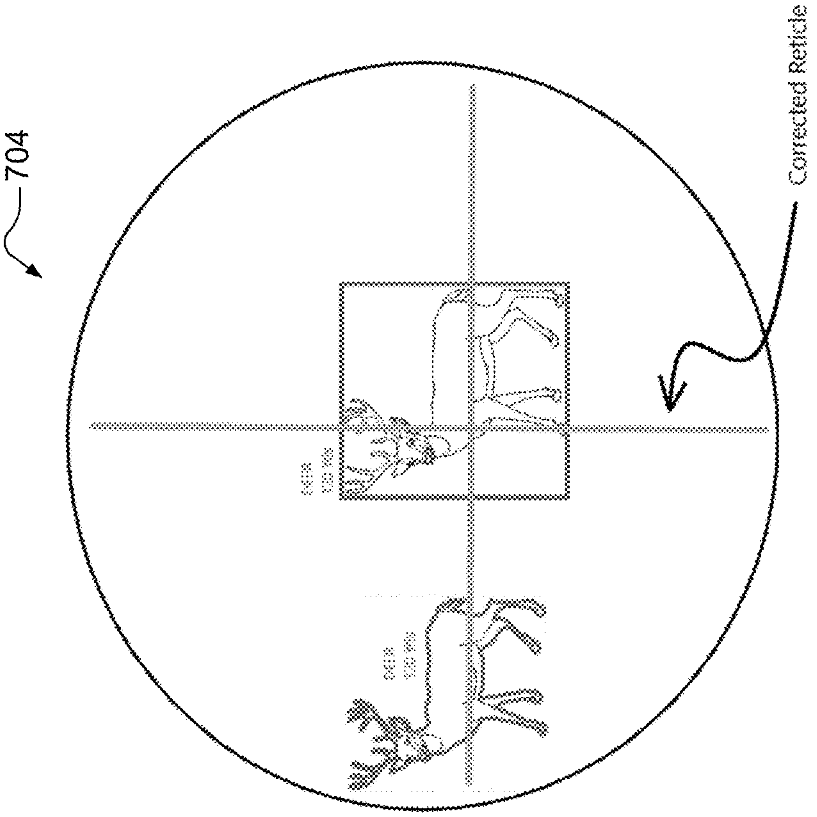
FIG. 7B is an image depicting an example display screen displaying a corrected reticle.

FIG. 7A is an image depicting an example display screen for displaying an uncorrected reticle, and FIG. 7B is an image depicting an example display screen displaying a corrected reticle. For example, FIG. 7A may be a default display with an uncorrected reticle 702, which has not been adjusted based on object information, target distance information, etc.

FIG. 7B illustrates an image having a corrected reticle 704. The corrected reticle (or disturbed reticle) is adjusted from the position of the uncorrected reticle 702 of FIG. 7A, based on any suitable information or calculations related to the target.

For example, the corrected reticle may be positioned based on object information of the target (e.g., classified as a DEER object), a distance to the target (e.g., a 120 yard range) etc. The corrected reticle may be moved in the field of view using ballistics information stored in the optic, any suitable object or target distance information as described above, etc.

Figure 8:
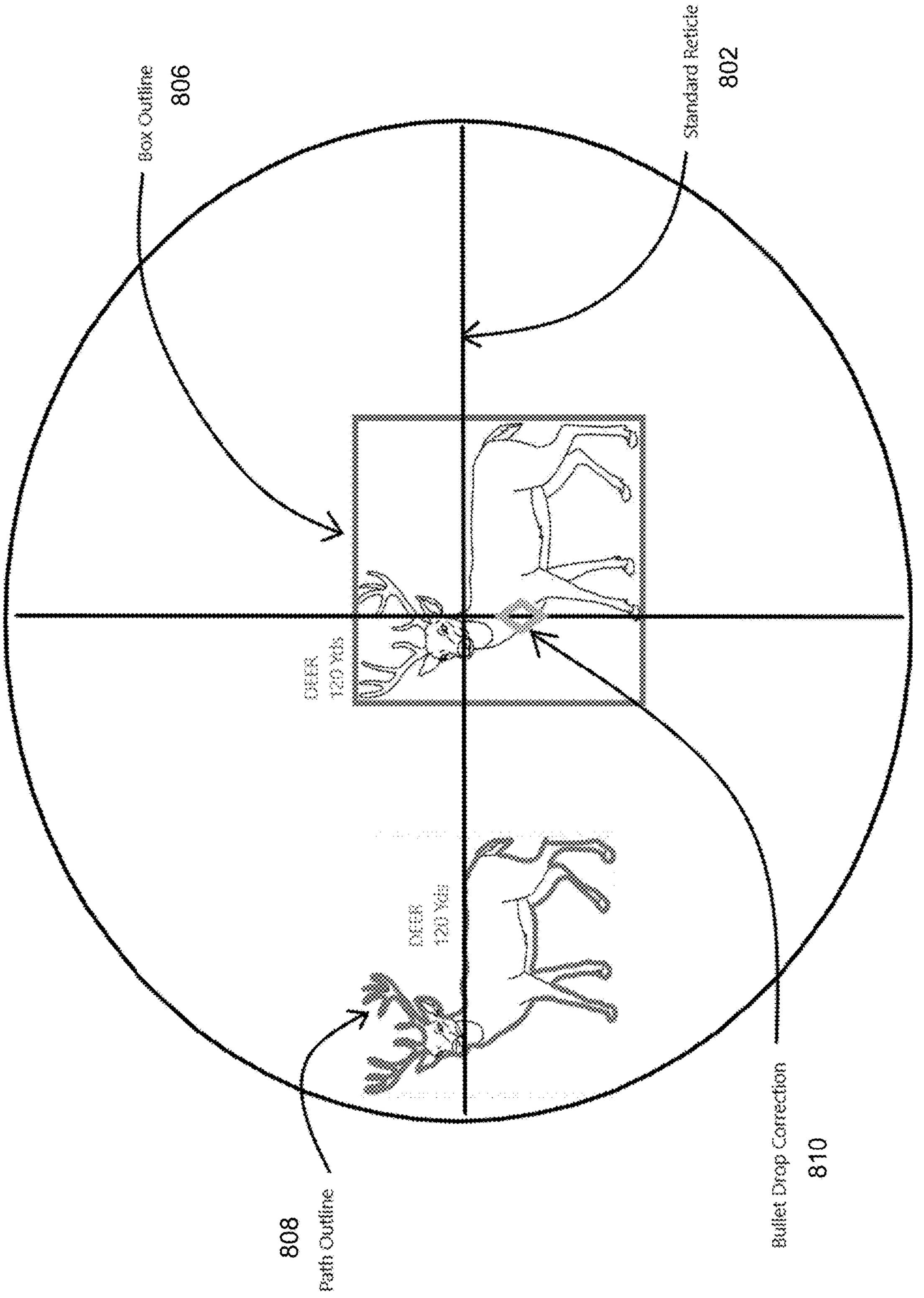
FIG. 8 is an image depicting an example display screen illustrating a bullet drop correction (BDC) reference.

FIG. 8 is an image depicting an example display screen illustrating a bullet drop correction (BDC) reference. As shown in FIG. 8, the display may include a standard reticle 802, a box outline 806 (e.g., highlighting an identified object), and a path outline 808 (e.g., highlighting a shape of another identified object).

The image may display a bullet drop correction (BDC) reference 810, which may be associated with one of the objects (such as the DEER object highlighted by the box outline 806). For example, a calculated distance to the object (e.g., 120 yards) may be used to determine a drop against a fixed reticle (such as the standard reticle 802).

On an optic having an electronic reticle, a corrected reticle (e.g., the corrected reticle 704 of FIG. 7B), or an indication of shot correction relative to a fixed reticle (e.g., the BDC reference 810 of FIG. 8), may be drawn based on a calculated distance to the target object, and ballistic information entered by the user.

Machine Learning Models

Figure 4A:
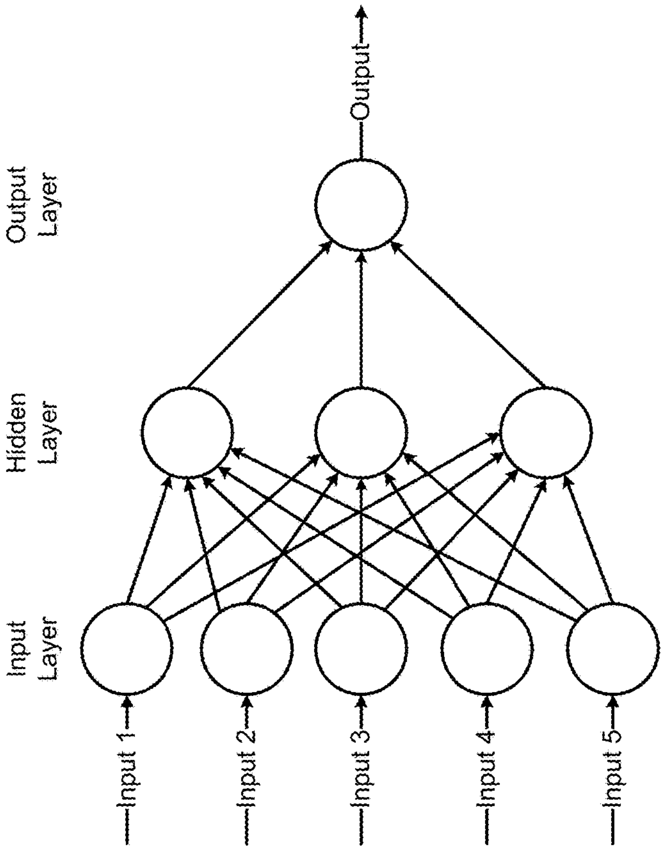
FIGS. 4A and 4B are graphical representations of example recurrent neural networks for generating machine learning models for object detection associated with real-time stadiametric ranging.
Figure 4B:
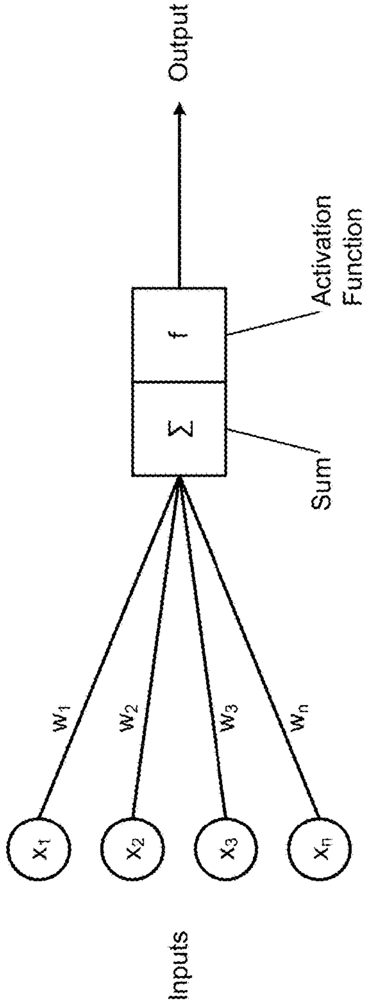

FIGS. 4A and 4B show an example of a recurrent neural network used to generate models, such as models for object detection associated with real-time stadiametric ranging, using machine learning techniques. Machine learning is a method used to devise complex models and algorithms that lend themselves to prediction (for example, health plan customer predictions). The models generated using machine learning can produce reliable, repeatable decisions and results, and uncover hidden insights through learning from historical relationships and trends in the data.

The purpose of using the recurrent neural-network-based model, and training the model using machine learning, may be to directly predict dependent variables without casting relationships between the variables into mathematical form. The neural network model includes a large number of virtual neurons operating in parallel and arranged in layers. The first layer is the input layer and receives raw input data. Each successive layer modifies outputs from a preceding layer and sends them to a next layer. The last layer is the output layer and produces output of the system.

FIG. 4A shows a fully connected neural network, where each neuron in a given layer is connected to each neuron in a next layer. In the input layer, each input node is associated with a numerical value, which can be any real number. In each layer, each connection that departs from an input node has a weight associated with it, which can also be any real number (see FIG. 4B). In the input layer, the number of neurons equals number of features (columns) in a dataset. The output layer may have multiple continuous outputs.

The layers between the input and output layers are hidden layers. The number of hidden layers can be one or more (one hidden layer may be sufficient for most applications). A neural network with no hidden layers can represent linear separable functions or decisions. A neural network with one hidden layer can perform continuous mapping from one finite space to another. A neural network with two hidden layers can approximate any smooth mapping to any accuracy.

The number of neurons can be optimized. At the beginning of training, a network configuration is more likely to have excess nodes. Some of the nodes may be removed from the network during training that would not noticeably affect network performance. For example, nodes with weights approaching zero after training can be removed (this process is called pruning). The number of neurons can cause under-fitting (inability to adequately capture signals in dataset) or over-fitting (insufficient information to train all neurons; network performs well on training dataset but not on test dataset).

Various methods and criteria can be used to measure performance of a neural network model. For example, root mean squared error (RMSE) measures the average distance between observed values and model predictions. Coefficient of Determination ($R^2$) measures correlation (not accuracy) between observed and predicted outcomes (for example, between trained model outputs and actual outputs of historical testing data. This method may not be reliable if the data has a large variance. Other performance measures include irreducible noise, model bias, and model variance. A high model bias for a model indicates that the model is not able to capture true relationship between predictors and the outcome. Model variance may indicate whether a model is stable (a slight perturbation in the data will significantly change the model fit).

Figure 5:
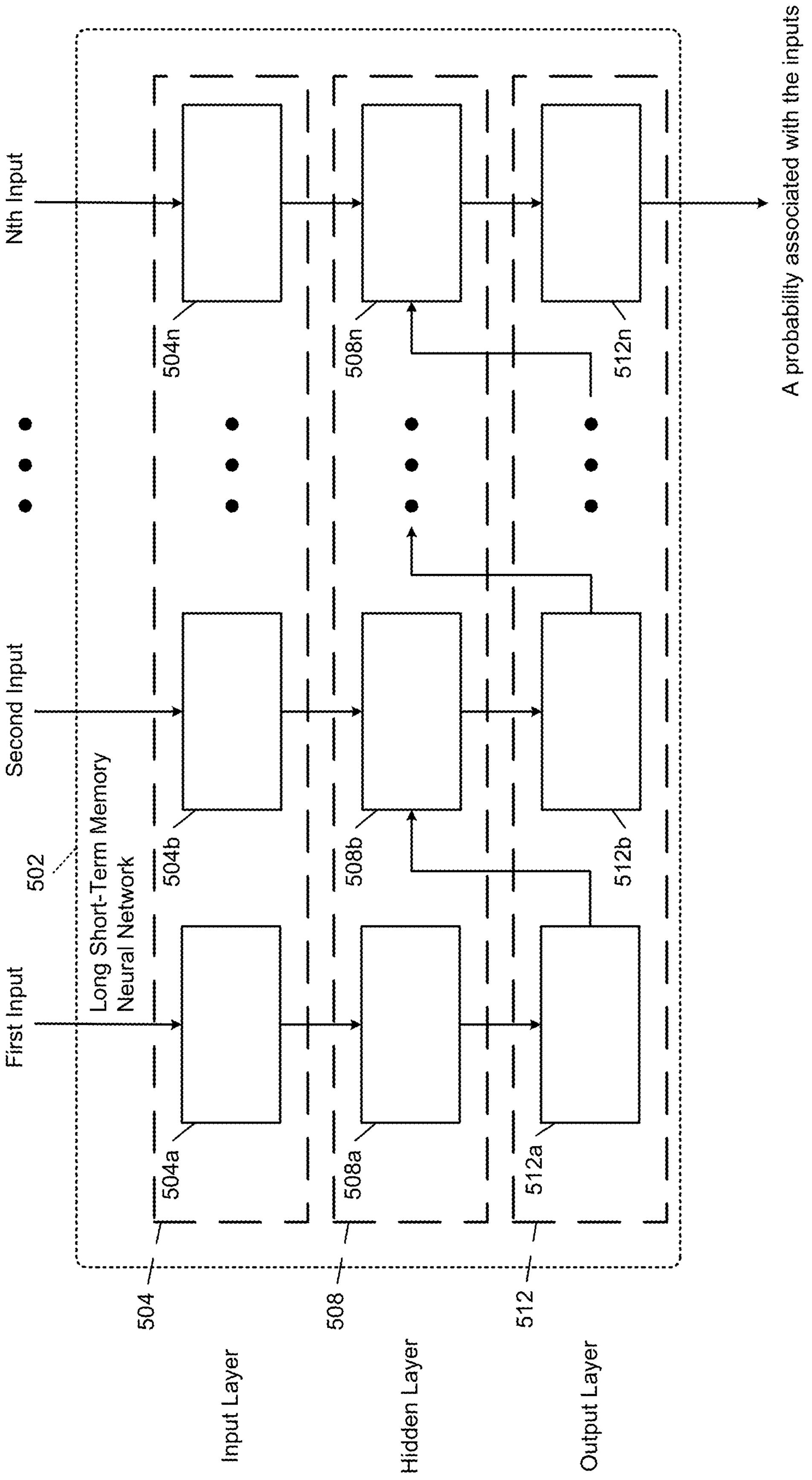
FIG. 5 is a graphical representation of layers or an example long short-term memory (LSTM) machine learning model.

FIG. 5 illustrates an example of a long short-term memory (LSTM) neural network 502 used to generate models for object detection associated with real-time stadiametric ranging, using machine learning techniques. The generic example LSTM neural network 502 may be used to implement one or more trained machine learning models, and various implementations may use other types of machine learning networks. The LSTM neural network 502 includes an input layer 504, a hidden layer 508, and an output layer 512. The input layer 504 includes inputs 504*a*, 504*b* . . . 504*n*. The hidden layer 508 includes neurons 508*a*, 508*b* . . . 508*n*. The output layer 512 includes outputs 512*a*, 512*b* . . . 512*n*.

Each neuron of the hidden layer 508 receives an input from the input layer 504 and outputs a value to the corresponding output in the output layer 512. For example, the neuron 508*a* receives an input from the input 504*a* and outputs a value to the output 512*a*. Each neuron, other than the neuron 508*a*, also receives an output of a previous neuron as an input. For example, the neuron 508*b* receives inputs from the input 504*b* and the output 512*a*. In this way the output of each neuron is fed forward to the next neuron in the hidden layer 508. The last output 512*n* in the output layer 512 outputs a probability associated with the inputs 504*a*-504*n*. Although the input layer 504, the hidden layer 508, and the output layer 512 are depicted as each including three elements, each layer may contain any number of elements.

In various implementations, each layer of the LSTM neural network 502 must include the same number of elements as each of the other layers of the LSTM neural network 502. For example, historical patient data may be processed to create the inputs 504*a*-504*n*. The output of the LSTM neural network 502 may represent likely entity field values within a prescription fill request document.

In some embodiments, a convolutional neural network may be implemented. Similar to LSTM neural networks, convolutional neural networks include an input layer, a hidden layer, and an output layer. However, in a convolutional neural network, the output layer includes one less output than the number of neurons in the hidden layer and each neuron is connected to each output. Additionally, each input in the input layer is connected to each neuron in the hidden layer. In other words, input 504*a* is connected to each of neurons 508*a*, 508*b* . . . 508*n*.

In various implementations, each input node in the input layer may be associated with a numerical value, which can be any real number. In each layer, each connection that departs from an input node has a weight associated with it, which can also be any real number. In the input layer, the number of neurons equals number of features (columns) in a dataset. The output layer may have multiple continuous outputs.

As mentioned above, the layers between the input and output layers are hidden layers. The number of hidden layers can be one or more (one hidden layer may be sufficient for many applications). A neural network with no hidden layers can represent linear separable functions or decisions. A neural network with one hidden layer can perform continuous mapping from one finite space to another. A neural network with two hidden layers can approximate any smooth mapping to any accuracy.

Figure 6:
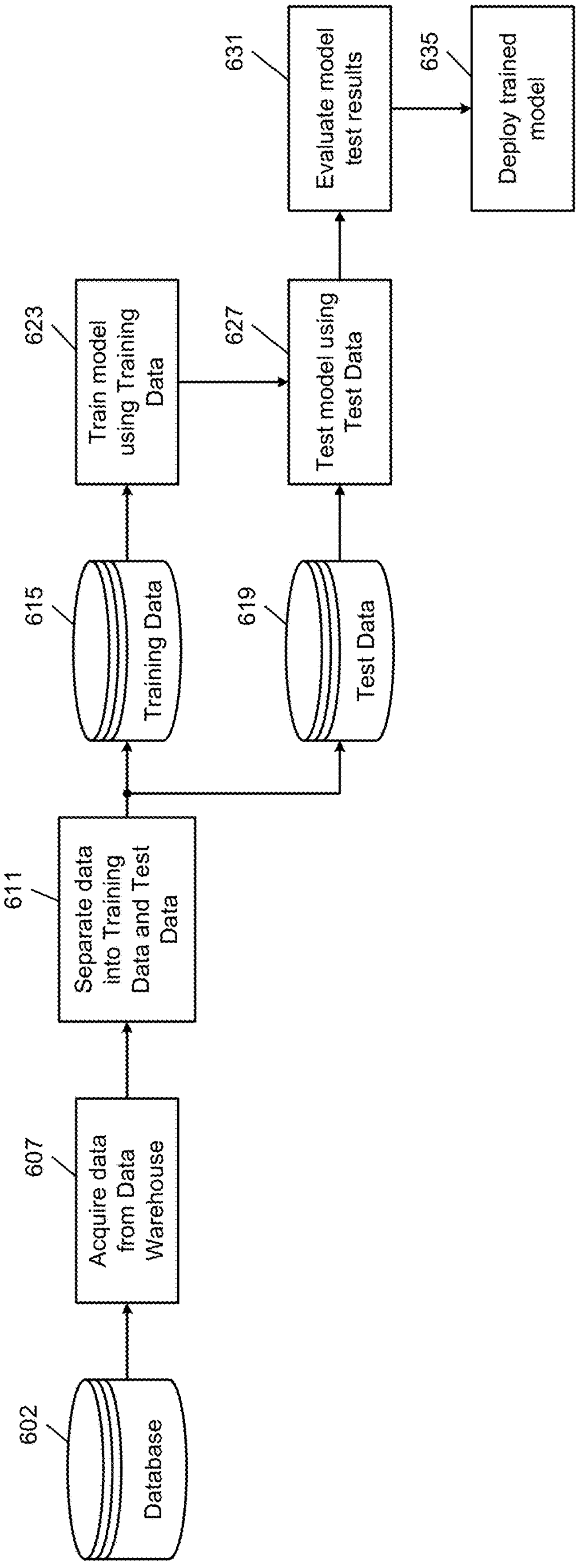
FIG. 6 is a flowchart depicting an example method of generating a machine learning model for object detection associated with real-time stadiametric ranging.

FIG. 6 illustrates an example process for generating a machine learning model. At 607, control obtains data from a data warehouse 603. The data warehouse 603 may include any suitable data for developing the machine learning model. For example, data from the data warehouse may be used to generate historical feature vector inputs for training the machine learning model. The historical feature vector inputs may include, for example, one or more of the object mode data 114, the object property data 116, and the lens and imager property data 118, of the database 102 in FIG. 1.

At 611, control separates the data obtained from the data warehouse 603 into training data 615 and test data 619. The training data 615 is used to train the model at 623, and the test data 619 is used to test the model at 627. Typically, the set of training data 615 is selected to be larger than the set of test data 619, depending on the desired model development parameters. For example, the training data 615 may include about seventy percent of the data acquired from the data warehouse 603, about eighty percent of the data, about ninety percent, etc. The remaining thirty percent, twenty percent, or ten percent, is then used as the test data 619.

Separating a portion of the acquired data as test data 619 allows for testing of the trained model against actual historical output data, to facilitate more accurate training and development of the model at 623 and 627. The model may be trained at 623 using any suitable machine learning model techniques, including those described herein, such as random forest, logistic regression, and neural networks.

At 631, control evaluates the model test results. For example, the trained model may be tested at 627 using the test data 269, and the results of the output data from the tested model may be compared to actual historical outputs of the test data 619, to determine a level of accuracy. The model results may be evaluated using any suitable machine learning model analysis.

After evaluating the model test results at 631, the model may be deployed at 635 if the model test results are satisfactory. Deploying the model may include using the model to make predictions for a large-scale input dataset with unknown outputs, and using the model to detect objects for real-time stadiametric ranging in an optic device. If the evaluation of the model test results at 631 is unsatisfactory, the model may be developed further using different parameters, using different modeling techniques, etc.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for displaying real time stadiametric range finding via an optic device, the method comprising:

receiving digital image data captured by one or more image capture devices;

detecting at least one object in the digital image data using at least one machine learning model;

determining a confidence level indicating a confidence of object detection performed by the at least one machine learning model;

transforming the at least one detected object into graphical markup data and identification data;

correlating the identification data with stored physical properties of one or more object types, including obtaining an average height physical property associated with a type of the at least one detected object from a database;

determining a minute of angle (MOA) that a pixel of a display of the optic device represents;

calculating a distance to the at least one detected object using correlated object properties and image capture device properties including the MOA that a pixel of the display represents, including calculating an estimated range from the optic device to the at least one detected object based on the average height physical property and a height of the at least one detected object in the digital image data;

displaying the calculated distance, confidence level and graphical object markup cues on the display of the optic device; and displaying a corrected reticle on the display of the optic device, wherein the corrected reticle is positioned based on the correlated object properties of the at least one detected object and the calculated distance to the at least one detected object.

2. The method of claim 1, wherein the one or more image capture devices include at least one of a lens of the optic device or an imager of the optic device.

3. The method of claim 1, wherein the digital image data captured by the one or more image capture devices includes image data captured via at least one of multiple image capture angles, multiple image capture wavelengths, multiple image capture bit depths, and multiple image capture resolutions.

4. The method of claim 1, wherein detecting at least one object includes applying an object detection algorithm to the digital image data.

5. The method of claim 4, wherein the object detection algorithm includes at least one of normalized correlation, feature-based pattern matching, or a convolutional neural network (CNN).

6. The method of claim 1, wherein transforming the at least one detected object includes generating graphical outline data to highlight the at least one detected object on the display of the optic device.

7. The method of claim 1, wherein the identification data includes at least one of an identification of the at least one detected object, a placement location of the at least one detected object, or an orientation of the at least one detected object.

8. The method of claim 1, wherein:

the database is configured to store physical properties of multiple object types; and correlating the identification data includes matching the identification data with the stored physical properties of the multiple object types, to select a strongest match between the identification data associated with the at least one detected object and the stored physical properties of at least one of the multiple object types.

9. The method of claim 8, wherein the stored physical properties include at least one of a minimum height of each object type, a maximum height of each object type, an average height of each object type, a minimum area of each object type, a maximum area of each object type, or average area of each object type.

10. The method of claim 1, wherein calculating the distance includes calculating an estimated range from the optic device to the at least one detected object based on at least one of a correlated area of the at least one detected object, or an orientation of the at least one detected object.

11. The method of claim 10, wherein calculating the distance includes calculating the estimated range according to at least one physical property of the one or more image capture devices.

12. The method of claim 11, wherein the at least one physical property includes at least one of a focal length of the one or more image capture devices, a field of view of the one or more image capture devices, or a focal plane geometry of the one or more image capture devices.

13. The method of claim 1, wherein displaying the calculated distance includes updating graphics of the display of the optic device to display at least one of a highlight of the at least one detected object, an estimated range of the at least one detected object, and a description of the at least one detected object.

14. The method of claim 1, wherein displaying the calculated distance includes displaying two estimated ranges, each estimated range corresponding to a different detected object.

15. The method of claim 1, further comprising:

detecting a second object in the digital image data using the at least one machine learning model; and displaying an updated corrected reticle on the display associated with the second object, in response to movement of the optic device to move an uncorrected reticle over the second object.

16. An optic device comprising:

a lens;

an imager configured to capture digital image data via the lens;

a display configured to display images to a user;

memory configured to store physical properties of one or more object types, and computer-executable instructions; and at least one processor configured to execute the computer-executable instructions to:

receive the digital image data captured by the imager;

detect at least one object in the digital image data using at least one machine learning model;

determine a confidence level indicating a confidence of object detection performed by the at least one machine learning model;

transform the at least one detected object into graphical markup data and identification data;

correlate the identification data with the physical properties of one or more object types stored in the memory, including obtaining an average height physical property associated with a type of the at least one detected object from memory;

determine a minute of angle (MOA) that a pixel of the display of the optic device represents;

calculate a distance to the at least one detected object using correlated object properties and image capture device properties including the MOA that a pixel of the display represents, including calculating an estimated range from the optic device to the at least one detected object based on the average height physical property and a height of the at least one detected object in the digital image data;

display the calculated distance, confidence level and graphical object markup cues on the display of the optic device; and display a corrected reticle on the display of the optic device, wherein the corrected reticle is positioned based on the correlated object properties of the at least one detected object and the calculated distance to the at least one detected object.

17. The optic device of claim 16, wherein the digital image data captured by the imager includes image data captured via at least one of multiple image capture angles, multiple image capture wavelengths, multiple image capture bit depths, and multiple image capture resolutions.

18. The optic device of claim 16, wherein:

detecting at least one object includes applying an object detection algorithm to the digital image data; and the object detection algorithm includes at least one of normalized correlation, feature-based pattern matching, or a convolutional neural network (CNN).

19. The optic device of claim 16, wherein transforming the at least one detected object includes generating graphical outline data to highlight the at least one detected object on the display of the optic device.

20. The optic device of claim 16, wherein the identification data includes at least one of an identification of the at least one detected object, a placement location of the at least one detected object, an orientation of the at least one detected object, a disturbed reticle location associated with the at least one detected object, or a shot correction reference associated with the at least one detected object.

* * * * *